US012800817B2

(12) United States Patent
Hokari et al.

(10) Patent No.: US 12,800,817 B2
(45) Date of Patent: Nov. 17, 2026

(54) POLARIZATION ELEMENT HAVING WIRE-GRID STRUCTURE AND MANUFACTURING METHOD THEREOF

(71) Applicant: National Institute of Advanced Industrial Science and Technology, Tokyo (JP)

(72) Inventors: Ryohei Hokari, Ibaraki (JP); Kazuma Kurihara, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 691 days.

(21) Appl. No.: 17/535,748

(22) Filed: Nov. 26, 2021

(65) Prior Publication Data

US 2022/0082751 A1 Mar. 17, 2022

Related U.S. Application Data

(63) Continuation of application No. PCT/JP2020/020986, filed on May 27, 2020.

(30) Foreign Application Priority Data

Jun. 26, 2019 (JP) ................................ 2019-118749

(51) Int. Cl.
*G02B 5/30* (2006.01)

(52) U.S. Cl.
CPC ................................ *G02B 5/3058* (2013.01)

(58) Field of Classification Search
CPC ...... G02B 5/3058; G02B 5/3025; G02B 5/30; G02B 5/3033; G02B 27/288; G02B 27/28
See application file for complete search history.

(56) References Cited

U.S. PATENT DOCUMENTS

2005/0146720 A1 7/2005 Hansen et al.
2012/0206580 A1 8/2012 Chung et al.
(Continued)

FOREIGN PATENT DOCUMENTS

JP 2008-522221 A 6/2008
JP 2012-13806 A 1/2012
(Continued)

OTHER PUBLICATIONS

Extended Search Report for family application (EP 20831441.9) dated Sep. 14, 2022, issued by EPO.
(Continued)

*Primary Examiner* — Sharrief I Broome
*Assistant Examiner* — Journey F Sumlar
(74) *Attorney, Agent, or Firm* — Shih IP Law Group, PLLC

(57) ABSTRACT

In this disclosure, there is provided a polarization element comprising a substrate having a predetermined light transmittance in a predetermined wavelength region and a plurality of polarization portions having a wire grid structure on the main surface of the above substrate, wherein the plurality of polarization portions are arranged to ensure that the ratio of the total area of the polarization portions to the predetermined area of the main surface gradually changes along a predetermined direction so that at least one of light transmittance and polarization degree gradually changes in the predetermined direction on the main surface of the substrate. A method for manufacturing the polarization element is also disclosed.

20 Claims, 9 Drawing Sheets

(56) References Cited

U.S. PATENT DOCUMENTS

| | | | | |
|---|---|---|---|---|
| 2013/0120698 | A1* | 5/2013 | Takakuwa | G02F 1/133528 349/110 |
| 2013/0201557 | A1 | 8/2013 | Davis et al. | |
| 2015/0028296 | A1 | 1/2015 | Jeong | |
| 2015/0279688 | A1* | 10/2015 | Cok | H01L 21/0274 359/485.05 |
| 2016/0299380 | A1 | 10/2016 | Nam | |
| 2016/0341859 | A1* | 11/2016 | Shvets | G02B 27/286 |
| 2017/0277023 | A1* | 9/2017 | Ishimatsu | G02B 5/3083 |
| 2017/0351012 | A1* | 12/2017 | Shishkin | G02B 5/20 |
| 2018/0006274 | A1* | 1/2018 | Kim | H10K 59/38 |
| 2019/0196080 | A1* | 6/2019 | Kumai | G02F 1/133528 |
| 2019/0326682 | A1* | 10/2019 | Qin | H01Q 1/48 |

FOREIGN PATENT DOCUMENTS

| | | | |
|---|---|---|---|
| JP | 2012-168531 | A | 9/2012 |
| JP | 2013-024982 | A | 2/2013 |
| JP | 2015-075746 | A | 4/2015 |
| JP | 2017-173760 | A | 9/2017 |
| WO | 2010/090085 | A1 | 8/2010 |

OTHER PUBLICATIONS

Extended European Search Report for PCT/JP2020020986 dated Sep. 14, 2022 issued by EPO.

Notice of Refusal for Reasons for priority application, JP2019-118749, issued by JPO on Mar. 28, 2023.

International Search Report for PCT Application No. PCT/JP2020/020986 Issued by Japana Patent Office as ISA on Aug. 11, 2020.

Office Action from EP Application No. 20831441.9 mailed Oct. 27, 2025, 7 pages.

* cited by examiner

| Region | Polarization Portion Occupancy Ratio (%) | Polarization Degree (%) |
|---|---|---|
| 1 | 100 | 99 |
| 2 | 80 | 68 |
| 3 | 64 | 45 |
| 4 | 36 | 30 |
| 5 | 20 | 15 |
| 6 | 8 | 13 |

FIG. 9

POLARIZATION ELEMENT HAVING WIRE-GRID STRUCTURE AND MANUFACTURING METHOD THEREOF

CROSS-REFERENCE TO RELATED APPLICATIONS

This is a continuation application of a prior PCT application No. PCT/JP2020/020986 filed on May 27, 2020.

TECHNICAL FIELD AND BACKGROUND ART

The present invention relates to a polarization element having a wire-grid structure and a method for manufacturing the same.

In order to improve the functionality and design of products comprising a polarization element such as liquid crystal displays, polarizing screens and polarizing sunglasses, there is an increasing demand for gradient polarization elements having the gradation of a polarization function within the plane of a polarization element. For example, in automobile head-up displays, the lower part of a polarizing screen has the function of displaying information clearly, and there is a need for elements that can ensure a gradually better view toward the top of the polarizing screen.

Wire-grid polarization elements are known as polarization elements (see, for example, Patent Documents 1 and 2). The wire-grid polarizing elements achieve polarization control by forming a line pattern having a size smaller than the wavelength of incident light from a metal material such as aluminum.

REFERENCE DOCUMENTS

Patent document 1: Japanese Patent Publication No. JP 2013-024982A

Patent document 2: Japanese Patent Publication No. JP 2017-173760A

SUMMARY OF THE INVENTION

In the wire-grid polarization element, polarization characteristics such as polarization degree, light transmittance, reflectance, polarization direction and the like are determined by the metal material of a wire, wire width, wire interval and wire height.

Since conventional wire-grid polarizing elements are fabricated by a combination of electron beam lithography, etching, vacuum film deposition, nanoimprinting and the like, it has been difficult to fabricate them by varying the height of the wire in plane space, which determines the polarization characteristics in order to provide a gradation function.

It is an object of the present invention to provide a polarizing element having a gradation function that at least one of light transmittance and polarizing degree is continuously or stepwise changed, and a method for manufacturing the same.

According to one aspect of the present invention, there is provided a polarizing element which comprises a substrate having predetermined light transmittance in a predetermined wavelength region and a plurality of polarization portions having a wire-grid structure on the main surface of the substrate, wherein the plurality of polarization portions are arranged to ensure that the ratio of the total area of the polarization portions to the predetermined area of the main surface gradually changes along a predetermined direction so that at least one of light transmittance and polarization degree gradually changes in the predetermined direction on the main surface of the substrate.

According to the above aspect, since the plurality of polarization portions having a wire-grid structure and portions of the substrate other than the polymerization portions are formed on the main surface of the substrate and the plurality of polarization portions are arranged to ensure that the ratio per the predetermined area of the main surface, that is, the ratio of the total area of the polarization portions to the total area of the substrate portions gradually changes along the predetermined direction on the main surface of the substrate, at least one of light transmittance and polarization degree gradually changes. Thereby, a gradation function for at least one of light transmittance and polarization degree can be provided.

According to another aspect of the present invention, there is provided a method for manufacturing a polarizing element in which at least one of light transmittance and polarization degree gradually changes in a predetermined direction, comprising the steps of;

- creating design data for arranging a plurality of polarization portions having a wire-grid structure to ensure that the ratio of the total area of the plurality of polarizing portions to the predetermined area of the main surface of the substrate gradually changes along the predetermined direction; and
- forming the plurality of polarization portions on the main surface of the substrate based on the design data.

According to the above aspect, the plurality of polarization portions are formed based on the design data for arranging the plurality of polarization portions having a wire-grid structure on the main surface of the substrate to ensure that the ratio of the total area of the polarization portions to the predetermined area of the main surface of the substrate gradually changes along the predetermined direction, thereby making it possible to form a polarizing element having a gradation function for at least one of light transmittance and polarization degree along the predetermined direction.

BRIEF DESCRIPTION OF THE DRAWINGS

FIG. 9 is a table showing the optical characteristics of a gradient polarizing element as an example.

DETAILED DESCRIPTION OF PREFERRED EMBODIMENTS

Hereinafter, embodiments of the present invention will be described based on the drawings below. The same signs are applied to elements common to multiple drawings, and repetitions of the detailed descriptions of the elements are omitted.

Figure 1:
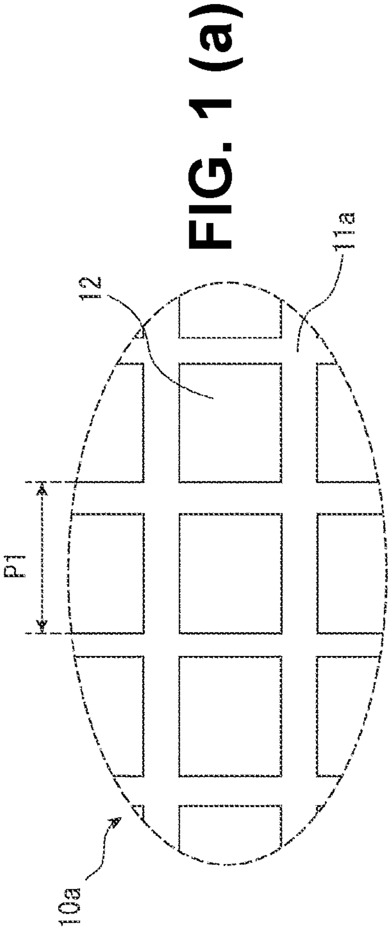
FIGS. 1(*a*) to 1(*c*) are a plan view and partial enlarged views of a gradient polarizing element according to one embodiment of the present invention.
Figure 1:
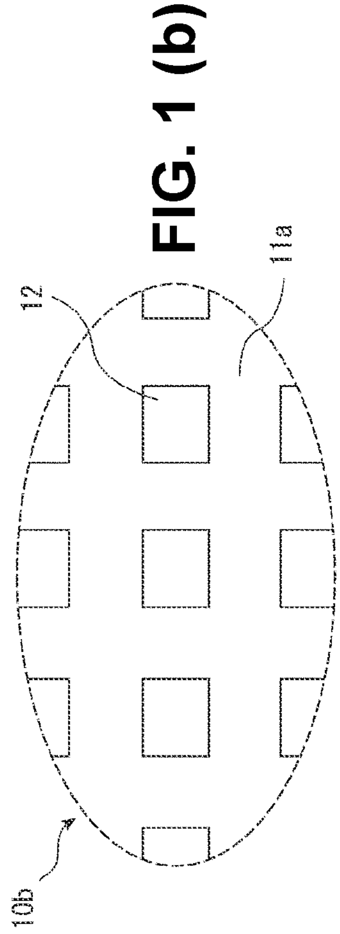
Figure 1:
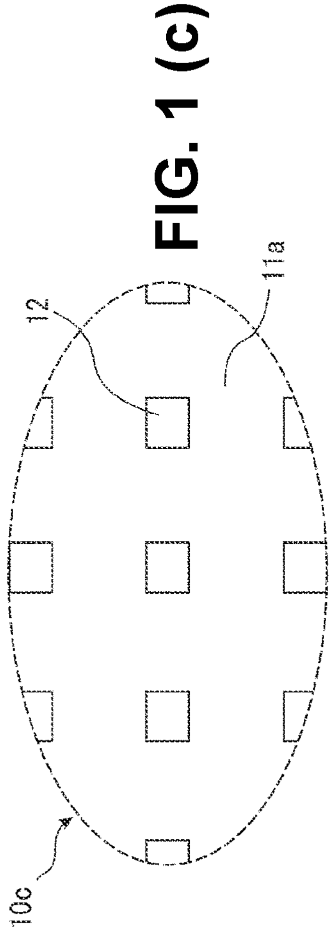
Figure 1:
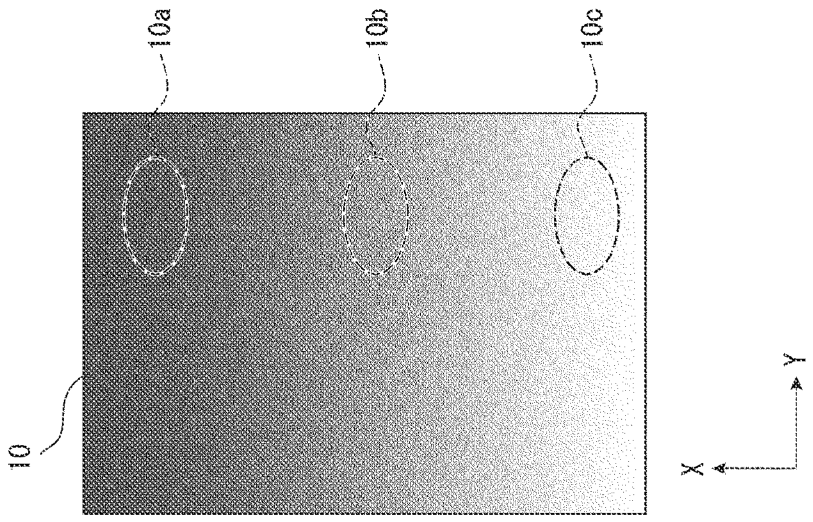
Figure 2:
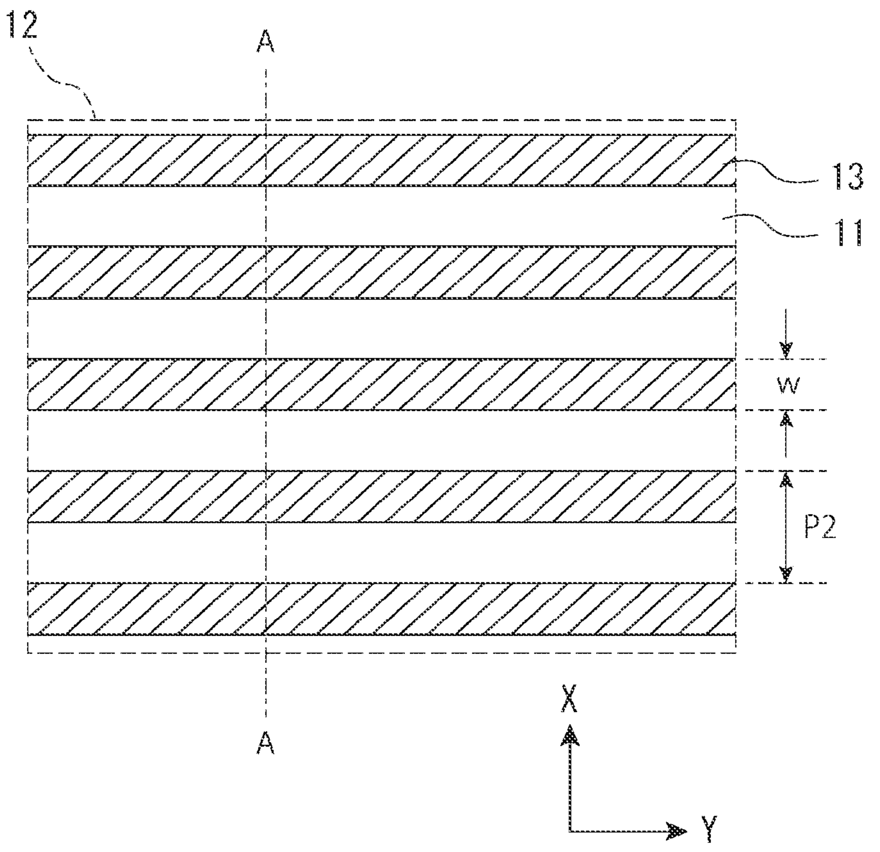
FIGS. 2(*a*) and 2(*b*) are enlarged plan and cross-sectional views of the polarization portion having a wire-grid structure.
Figure 2:
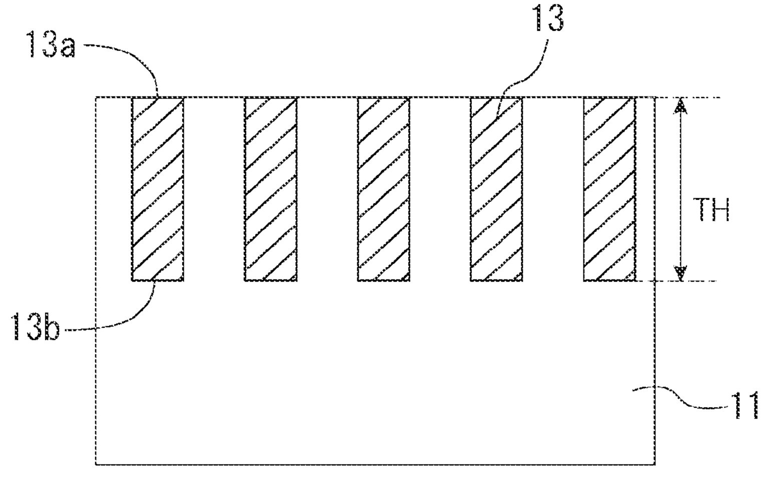

FIGS. 1(*a*) to 1(*c*) are a plan view and partial enlarged views of a gradient polarizing element according to one embodiment of the present invention, and the left figure is a plan view and FIGS. 1(*a*) to 1(*c*) are partial enlarged views of three parts where the polarization degree gradually changes along the X axis. FIGS. 2(*a*) and 2(*b*) show a polarization portion, wherein FIG. 2(*a*) is a plan view and FIG. 2(*b*) is a cross-sectional view taken along line A-A shown in FIG. 2(*a*).

Referring to FIGS. 1(*a*) to 1(*c*), the gradient polarization element 10 has a substrate 11 and a plurality of polarization portions 12 formed on the surface of the substrate 11.

In the gradient polarization element 10, the polarization portions 12 are arranged in such a way that the polarization degree gradually decreases from the top to the bottom of the paper along the X-axis direction.

A material having transparency (predetermined light transmittance) in a wavelength region in which the gradient polarization element 10 is used, for example, a visible light region, an infrared light region or the like may be used for the substrate 11.

The substrate 11 can be made of, for example, polymethyl methacrylate resin (PMMA), polycarbonate resin (PC), polystyrene (PS) resin, cyclo-olefin polymer (COP) resin, cross-linked polyethylene resin, polyvinyl chloride resin, polyarylate resin, polyphenylene ether resin, modified polyphenylene ether resin, polyetherimide resin, polyethersulfone resin, polysulfone resin, polyetherketone resin and other amorphous thermoplastic resins, polyethylene terephthalate (PET), polyethylene naphthalate resin, polyethylene resin, polypropylene rein, polybutylene terephthalate resin, aromatic polyester resin, polyacetal resin, polyamide resin and other crystalline thermoplastic resins, acrylic, epoxy, urethane and other UV curable resins and thermosetting resins, triacetate (TAC) resin, and glass, silicon, quartz, ceramic materials and other inorganic base materials.

Although the substrate 11 composed of a single layer of one of the above materials is preferred as it is easy to bend it, a substrate composed of multiple layers or a substrate made of a combination of different materials may also be used.

The polarization portion 12 comprises a plurality of metal portions 13 which extend in one direction, e.g., the Y-axis direction, are periodically arranged at predetermined intervals in the X-axis direction and have a predetermined thickness. In this example, the metal portions 13 are embedded in the substrate 11.

Even if the wavelength range in which the gradient polarizer 10 is used is the visible light range or other wavelength ranges, such as the ultraviolet, near-infrared, infrared, terahertz, and microwave ranges, the width w (length in the X-axis direction) of the metal portion 13 is preferably about ½ or less of the wavelength of the electromagnetic wave to be targeted, and more preferably about 1/16 to ¼.

Although light transmittance becomes higher as the pitch P2 (distance in the X-axis direction between adjacent metal portions 13) of the metal portions 13 relative to the width w becomes larger, the pitch P2 is preferably 1.2 to 10 times the width w and more preferably 2 to 5 times the width w in view of balance between the polarization degree and the light transmittance. Since the polarization degree tends to become higher as the thickness TH of the metal portion 13 becomes larger, the thickness TH is preferably 1 time or more the width w and more preferably 7 to 30 times.

When the gradient polarizing element 10 is used in the visible light range, the width w of the metal portion 13 is preferably 200 nm or less and more preferably 25 to 100 nm, the pitch P2 is preferably 400 nm or less and more preferably 50 to 150 nm (the pitch P2 is preferably 1.2 to 10 times and more preferably 2 to 5 times the width w), and the thickness TH is preferably 50 nm or more and more preferably 200 to 1,000 nm.

The cross-sectional shape of the metal portion 13 in the thickness direction may be rectangular as shown in FIG. 2(*b*) or a bullet shape (round shape), oval shape, rhombus shape, or a shape similar thereto. The upper surface 13*a* or the lower surface 13*b* in the thickness direction of the metal portion 13 may be flat, tapered, round or uneven.

The metal portion 13 should be made of a metal material having a negative real part of dielectric constant in the wavelength range to be used.

For example, a highly reflective metal material such as aluminum, gold, silver, copper, platinum, etc., or a low reflective metal material such as molybdenum, nickel, chromium, titanium, tungsten, tantalum, zirconium, iron, niobium, hafnium, cobalt, etc., and alloys thereof can be used for the metal portion 13. In addition, other metallic materials can also be used.

Returning to FIGS. 1(*a*) to 1(*c*), in the gradient polarization element 10, a large number of polarization portions 12 are arranged on one surface of the substrate 11 in such a manner that they are spaced apart or adjacent to each other. In the gradient polarizing element 10, polarization degree and light transmittance are controlled by the ratio of the total area of the polarization portions 12 to the total area of substrate portions 11*a* other than the polarization portions (to be simply referred to as "substrate portions 11*a*" hereinafter), i.e., the area ratio of the total area of the plurality of polarization portions 12 included per unit area to the total area of the substrate portions 11*a*.

In other words, polarization degree and light transmittance are controlled by the ratio of the total area of the plurality of polarization portions 12 included per unit area of the gradient polarization element 10 (to be referred to as "polarization portion occupancy ratio (%)" hereinafter). The polarization portion occupancy ratio is the ratio of the area occupied by one polarization area 12 in one cycle of the array when the plurality of polarization portions 12 are of the same shape and size and are regularly arranged.

In each of the polarization portions 12 of the gradient polarization element 10, the wire-grid structure transmits electric field light perpendicular to the longitudinal direction of the metal portion 13 (Y-axis direction shown in FIGS. 2(*a*) and 2(*b*)) and does not transmit electric field light parallel to the longitudinal direction.

Thereby, the light transmittance of each polarization portion 12 is determined. It is assumed herein that the wire-grid structures of the polarization portions 12 have the same width w, same pitch P2 and same thickness TH, and the polarization portions 12 have the same light transmittance.

In FIGS. 1, region 10*a* with relatively low light transmittance, region 10*b* with intermediate light transmittance, and region 10*c* with relatively high light transmittance shown in the left figure are shown in FIGS. 1(*a*), 1(*b*) and (*c*), respectively.

In region 10*a*, the polarization portion occupancy ratio, i.e., the ratio of the area occupied by one polarization portion 12 in one cycle of the array (=area of one polarization area 12/(total area of one polarization portion 12 and substrate portion 11*a*)×100) is 60%.

Since the size of each polarization portion 12 in region 10*b* is smaller than that of the polarization portion 12 in region 10*a* and the total area of the substrate portions 11*a* increases accordingly, the polarization portion occupancy ratio becomes 25%.

Since the size of each polarization portion 12 in region 10*c* is much smaller in region 10*a* and the total area of the substrate portions 11*a* increases accordingly, the polarization portion occupancy ratio becomes 10%.

Thus, the gradient polarizing element 10 gradually changes the polarization portion occupancy ratio along the X-axis direction to form the gradations of polarization degree and light transmittance.

In each of the regions 10*a* to 10*c* arranged in the gradient polarization element 10, the polarization portions 12 are rectangular in a plan view and regularly arranged in the same shape and the same size. It is to be noted that, even in different regions, the number per unit area of the polarization portions 12 having the same shape and the same size may be varied for each of the regions 10*a* to 10*c* in order to achieve a desired polarization portion occupancy ratio.

Although there are no restrictions on the shape of the polarization portion 12 in a plan view, it may be a square, rectangle, circle, oval, diamond-shaped, triangle, polygon such as a star, or complex shape such as a crescent, and it is preferably a square or circle from the viewpoint of structural isotropy.

The size of each of the polarization portions 12 in a plan view is preferably 1 μm to 1 mm and more preferably 1 μm to 200 μm, in the longitudinal direction and the transverse direction.

There is no restriction on the arrangement of the polarization portions 12, and they should be arranged in two dimensions, for example, hexagonally, at arbitrary intervals.

As shown in FIGS. 1 (*a*) to (*c*), it is preferable from the viewpoint of structural isotropy that the polarization portions 12 should be square-arrayed regularly in the X-axis and Y-axis directions.

The polarization portions 12 may be in contact with adjacent polarization portions 12 or separated from each other with the substrate portions 11*a* therebetween. It is preferable from the viewpoint of the control of polarization degree and light transmittance that adjacent polarization portions 12 should be separated from each other.

When adjacent polarization portions 12 are in contact with each other, the polarization characteristics of the polarization portions 12 function as they are. The pitch P1 of the adjacent polarization portions 12 (i.e., the distance between the adjacent polarization portions 12) is preferably from 1 μm to 1 mm and more preferably from 10 μm to 200 μm from the viewpoint of manufacturing and visibility.

The pitch P1 of the polarization portion 12 may be a constant value or may be changed and should be selected from a range of 1 μm to 1 mm in each of the regions 10*a* to 10*c*.

The polarization portions 12 may have the same wire-grid structure, different wire-grid structures or wire-grid structures of different sizes in the gradient polarizing element 10, and it is preferred that the polarization portions 12 should have the same wire-grid structure in terms of ease of manufacture.

Preferably, 1 to 4 million polarization portions 12 are formed per 1 $mm^2$ of the main surface of the gradient polarization element 10. In this case, each of the polarization portions 12 should have an area of $1\times10^{-6}$ $mm^2$ to 1 $mm^2$, and the polarization portion occupancy ratio is $1\times10^{-4}$ to 100%.

From the viewpoint of controlling polarization degree and the light transmittance, it is more preferable that 1 to 400 polymerization portions 12 should be formed per 1 $mm^2$.

In addition to a case where the polarization degree and light transmittance of the gradient polarizing element 10 gradually change along the X-axis direction shown in FIGS. 1(*a*) to 1(*c*), a periodic gradation may be formed in which polarization degree and light transmittance increase and decrease repeatedly along a certain direction in a single gradient polarizing element, there may be discontinuous portions in the gradation, and the polarization portions 12 may be arranged only in part of the gradient polarizing element to form the gradations of polarization degree and light transmittance.

Figure 3:
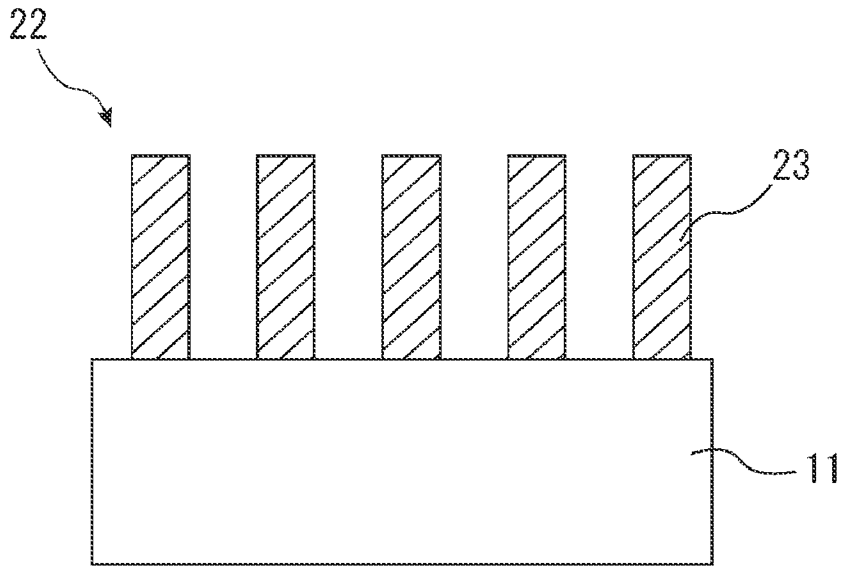
FIGS. 3(*a*) and 3(*b*) are enlarged cross-sectional views of variations of the polarization portion having a wire-grid structure.
Figure 3:
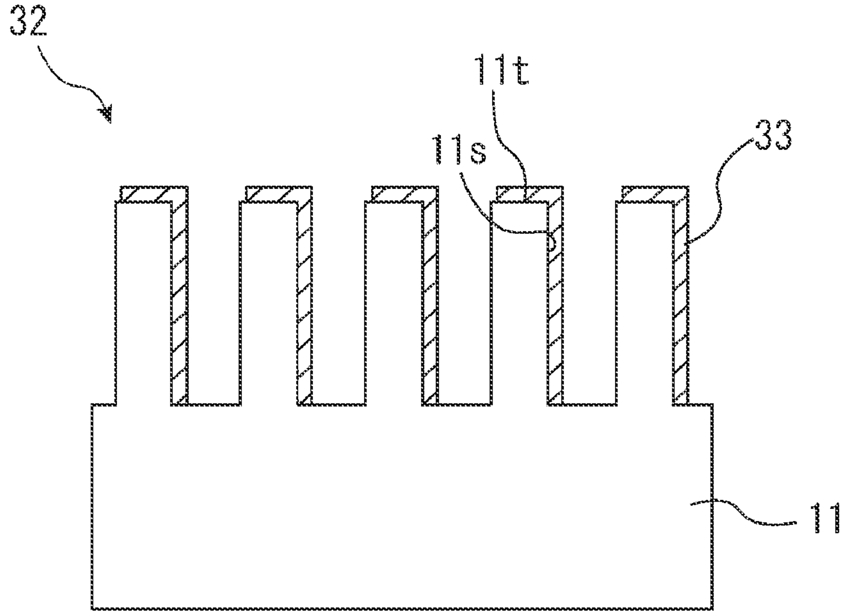

FIGS. 3(*a*) and 3(*b*) are enlarged cross-sectional views of variations of the polarization portion having a wire-grid structure. Referring to FIG. 3(*a*), the polarization portion 22 of one of the variations has a wire-grid structure. The polarization portion 22 has a configuration in which metal portions 23 are formed on the substrate 11. Except that, it has the same wire-grid structure as that of the polarization portion 12 shown in FIGS. 2(*a*) and 2(*b*).

Referring to FIG. 3(*b*), the polarization portion 32 of the other variation has a wire-grid structure. The polarization portion 32 has a configuration in which metal portions 33 are formed to cover one side wall 11*s* of each groove formed in the substrate 11 and the substrate surface lit contiguous thereto. Except that, it has the same wire-grid structure as that of the polarization portion 12 shown in FIGS. 2(*a*) and 2(*b*). These polarization portions 22 and 32 have the same action and effect as the polarization portion 12 shown in FIGS. 2(*a*) and 2(*b*).

According to this embodiment, in the gradient polarizing element 10, a large number of polarization portions 12 and substrate portions 11*a* other than the polarization portions 12 are formed on the surface of the substrate 11, and the polarization portions 12 having optical characteristics such as certain polarization degree and light transmittance are arranged on the surface of the substrate 11 to control the polarization portion occupancy ratio which differs in each of the regions, whereby average optical characteristics such as polarization degree and light transmittance are determined for each of the regions. The gradient polarizing element 10 having polarization degree and light transmittance which change along the X-axis direction is formed by changing the polarization portion occupancy ratio gradually or stepwise along the X-axis direction.

That is, although the polarization portions 12 differ from the substrate portions 11*a* other than the polarization portions 12 in polarization degree microscopically, if a light flux transmitted through the gradient polarizing element 10 is sufficiently larger than the size of the unit configuration of the polarization portion 12 and the substrate portion 11*a*, the transmitted light will be affected by the average optical properties of the gradient polarization element 10

As an alternative example, the gradient polarizing element 10 may have a configuration in which the polarization portions 12 and the substrate portions 11*a* are exchanged. That is, the wire-grid structure is formed in the substrate portions 11*a* shown in FIGS. 1(*a*) to 1(*c*), and the polarization portions 12 are changed to non-polarization portions having no polarizing function.

As a result, the gradient polarization element of the alternative example forms gradation in which at least one of polarization degree and light transmittance along the X-axis direction of the gradient polarization element 10 shown in FIGS. 1(*a*) to 1(*c*) decreases from the bottom to the top of the paper.

In the gradient polarizing element of the alternative example, the polarization portions 12 having a wire-grid structure may be formed over the entire surface of the substrate 11, the non-polarization portions may be formed by removing the wire-grid structures of the polarization portions 12 shown in FIGS. 1(*a*) to 1(*c*), and the non-polarization portions may be a hole penetrating the substrate.

The gradient polarizing element of the alternative example may be constituted such that the pattern 100*sl* of the metal portions of the polarization portions of a mold 100*b* shown in FIGS. 5(*d*) to 5(*e*) which will be described hereinafter is used to form the polarization portions and the non-polarization portions of the gradient polarizing element of this alternative example.

Figure 4:
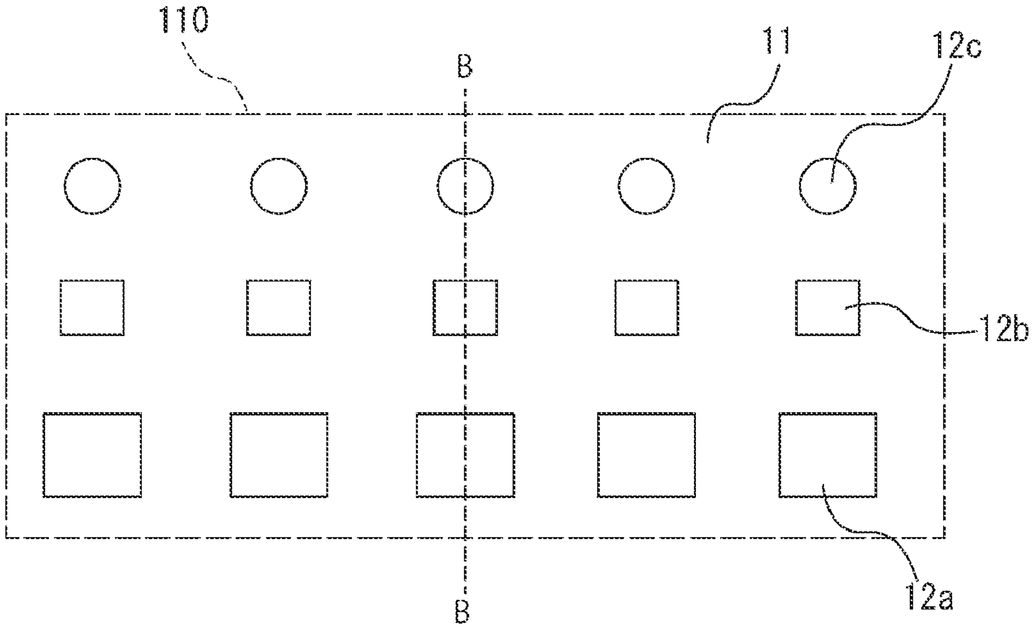
FIG. 4 is an enlarged plan view of a variation of the gradient polarization element according to another embodiment of the present invention.

FIG. 4 is an enlarged plan view of a variation of the gradient polarizing element according to another embodiment of the present invention and shows part of the variation of the gradient polarizing element. Referring to FIG. 4, the gradient polarization element 110 has rectangular polarization portions 12*a* and 12*b* and round polarization portions 12*c* separated from the polarization portions 12*a* and 12*b* on part of the surface of the substrate 11.

The manufacturing process of the gradient polarization element 110 will be explained with reference to BB line cross-sectional views of FIG. 4.

Figure 5:
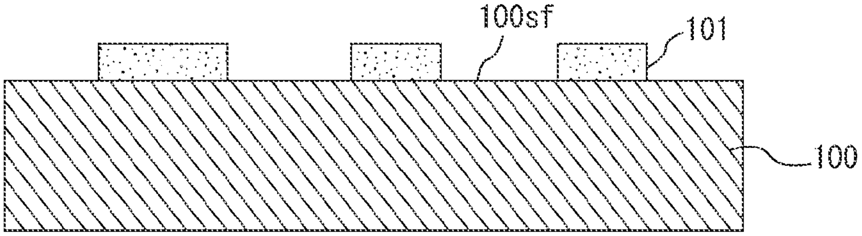
FIGS. 5(*a*) to 5(*f*) show a process for manufacturing a gradient polarization element according to one embodiment of the present invention.
Figure 5:
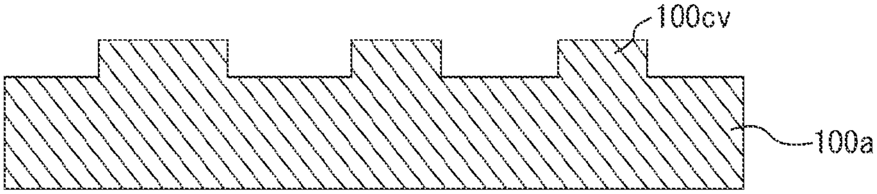
Figure 5:
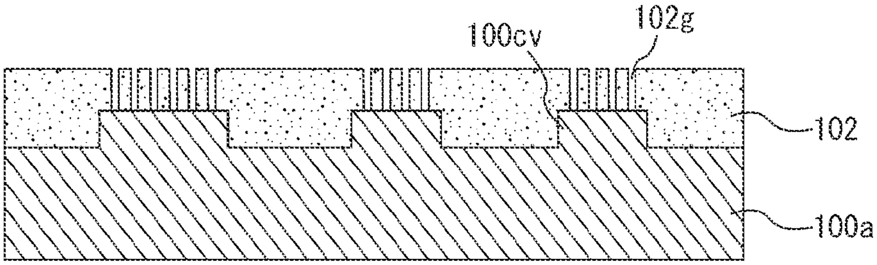
Figure 5:
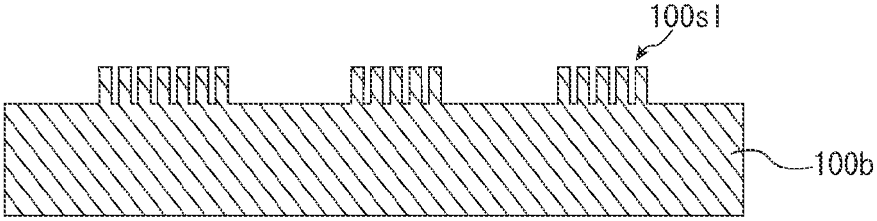
Figure 5:
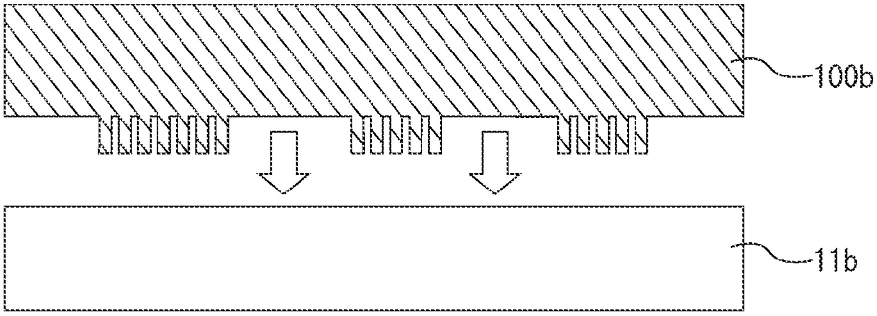
Figure 5:
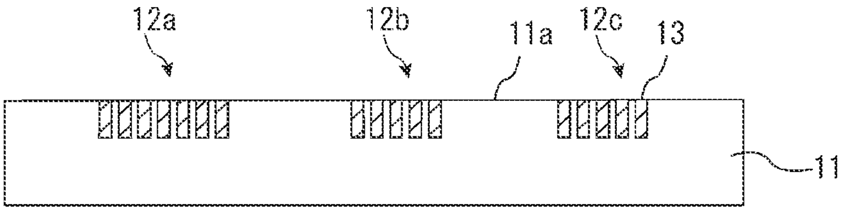

FIGS. 5(*a*) to 5(*f*) are diagrams showing the manufacturing process of the gradient polarizing element according to one embodiment of the present invention.

FIGS. 5(*f*) is a BB line cross-sectional view of the above FIG. 4. Referring to FIGS. 5(*a*) to 5(*f*) together with the above FIGS. 1(*a*) to 1(*c*), 2(*a*) and 2(*b*) and 4, the manufacturing process of the gradient polarizer according to one embodiment of the present invention will be described below.

This manufacturing process includes a design data preparation step in which the specifications and arrangement of the polarization portions are determined based on the polarization portion occupancy ratio of the polarization portions 12 in each region along a predetermined direction to achieve a desired gradation function and a polarization portion forming step in which the polarization portions 12 are formed on a substrate based on the design data. The polarization portion forming step includes a mold fabrication sub-step, an imprinting sub-step and a printing sub-step for forming polarization portions having a wide-grid structure by using the fabricated mold.

Prior to the step of FIG. 5(*a*), design data for determining the specifications and arrangement of the polarization portions based on the polarization portion occupancy ratio of the polarization portions 12 of each region along a predetermined direction is created to achieve a desired gradation function. Specifically, at least one of the polarization degree and the light transmittance of each region along the predetermined direction is set so that the desired gradation function is formed.

Arithmetic operation is carried out from data on the average visual transmittance in each direction obtained corresponding to the polarization portion occupancy ratio of the polarization portions 12 based on data on the visual transmittance in each polarization direction obtained by the width w, pitch P2 and thickness TH of the metal portions of the wire-grid structure of the polarization portion 12. Thereby, design data for determining the arrangement of the polarization portions 12 and design data for determining the specifications such as width w, pitch P2 and thickness TH of the metal portions of the wire-grid structure of the polarization portion 12 are created.

In the step shown in FIG. 5(*a*), a photosensitive resin layer is formed on the base material to be used as a mold. Then, the exposure processing of the photosensitive resin layer is performed by lithography based on the prepared design data for determining the shape of the polarization portion and the polarization portion occupancy ratio of the polarization portions to form a gradation function. Next, masks 101 for covering regions for forming the polarization portions are formed by etching.

As the material of the base material to be used as a mold, silicon, glass such as quartz, ceramics such as alumina and silicon carbide, and metals such as nickel can be used, and silicon is preferably used. In addition, a multilayer material having a metal layer, a semiconductor layer, or a dielectric layer formed on these materials may be used.

In the step of FIG. 5(*b*), the surface 100*sf* of the base material is etched, and portions covered with the masks 101 are left as convex portions 100*cv*.

As the etching method, chemical etching, mechanical processing, ion beam processing, laser processing, etc. can be used, and plasma etching is particularly preferable in terms of processing accuracy. Next, the masks 101 are removed. As a result, the portions covered with the masks remain on the base material 100*a* as the convex portions 100*cv*.

In the step shown in FIG. 5(*c*), a photosensitive resin layer covering the surface of the base material 100*a* is formed. Next, the photosensitive resin layer is exposed by lithography based on the created design data that determines the width w, pitch P2, and thickness TH of the metal portions of the wire-grid structure of the polarization portion 12, and then the exposed photosensitive resin layer is removed to form a mask 102.

In the mask 102, grooves 102*g* for forming a wire-grid structure on the convex portions 100*cv* are formed in a slit shape. The mask 102 may be formed using a printing method, imprinting method, self-assembly technique using block copolymers, etc.

The step of forming the mask 102 in the step shown in FIG. 5(*c*) may be performed simultaneously with the step of FIG. 5(*a*) by employing a high-precision forming method, e.g., lithography. Alternatively, an ultraviolet curable resin may be applied to the surface of the base material 100*a* to form the grooves 102*g* of the wire-grid structure in the ultraviolet curable resin on the surfaces of the convex portions 100*cv* by using a mold having projections formed on the entire surface thereof.

In the step of FIG. 5(*d*), the base material 100*a* is etched using the mask 102 to form the pattern of the metal portions of the polarization portion on the surface of the base material. Thus, a mold 100*b* for manufacturing the gradient polarization element 110 is manufactured. As the etching method, chemical etching, mechanical processing, ion beam processing, laser processing, etc. can be used, and plasma etching is particularly preferred in terms of processing accuracy.

As a variation, the mold 100*b* shown in FIG. 5(*d*) may be manufactured by first performing the steps of FIGS. 5(*c*) and 5(*d*) to form the pattern of the metal portions of the polarization portion on the surface of the base material and then performing the steps of FIGS. 5(*a*) and 5(*b*) to remove the base material other than portions which will become the polarization portions.

In the step of FIG. 5(*e*), the mold 100*b* is pressed against the target substrate 11*b* by the imprinting method to form the grooves in a slit-like pattern of the polarization portions in the surface of the substrate 11*b*. In the imprinting method, for example, thermoplastic resin or glass is used for the substrate 11*b*, and the mold 100*b* is pressed against the substrate 11*b* by heating the substrate 11*b* to a temperature higher than the glass transition temperature and applying pressure.

Alternatively, the mold 100*b* may be pressed against the substrate 11*b* by using a photocurable resin for the substrate 11 and then, the photocurable resin may be irradiated with ultraviolet light. The mold 100*b* may be used to form the slit-like pattern of the polarization portions in the surface of the substrate by the injection molding method. Although the mold release agent can be suitably selected according to the material of the mold 100*b* and the material of the substrate 11*b*, a fluorine mold release agent is preferable in terms of releasability. Depending on the material of the mold 100*b* and the material of the substrate 11*b*, a silicone mold release agent may be preferred.

In the step of FIG. 5(*f*), a metal material is filled into the grooves of the pattern of the substrate that will become the polarization portion to form metal portions 13.

Thereby, a gradient polarizing element 110 in which polarization portions 12*a* to 12*c* and substrate portions 11*a* other than these polarization portions are formed in the substrate 11 is formed. As the method for filling the grooves with the metal material, printing, physical vapor deposition, chemical vapor deposition and plating methods using metal ink may be used.

According to this manufacturing method, a large number of gradient polarization elements can be easily formed with one mold 100*b*.

As an alternative example of this manufacturing method, the grooves of the pattern that will become the polarization portion may be formed directly in the surface of the substrate 11 by lithography, focused ion beam method, self-assembly technique using nanoparticles or the like without using the mold 100*b*.

Figure 6:
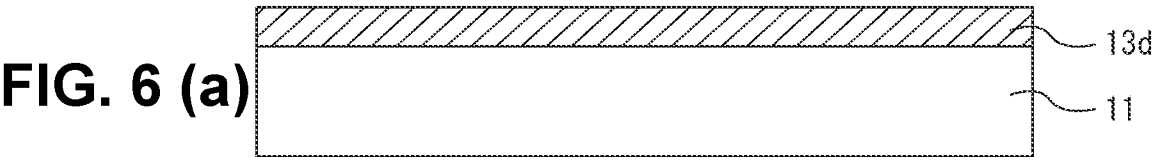
FIGS. 6(*a*) to 6(*e*) show another process for manufacturing a gradient polarization element according to another embodiment of the present invention.
Figure 6:
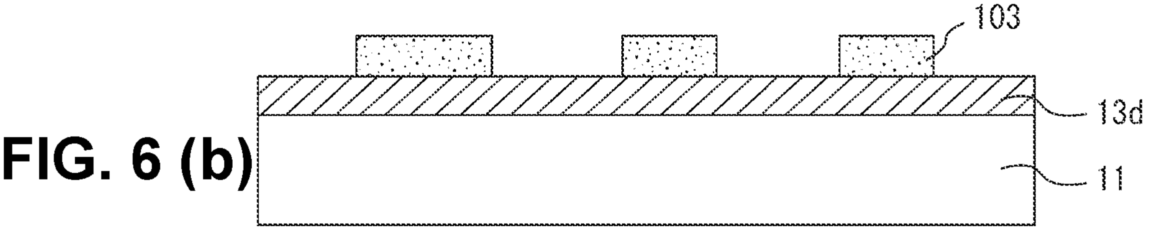
Figure 6:
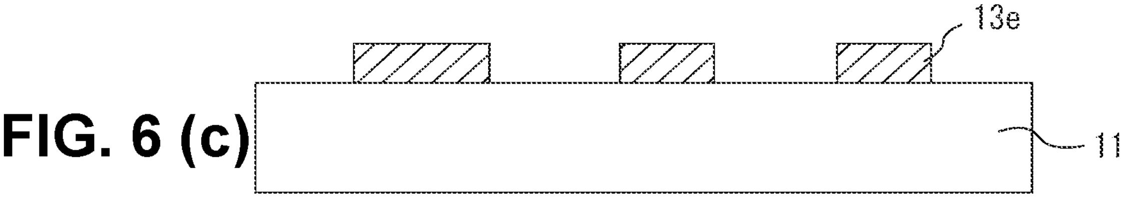
Figure 6:
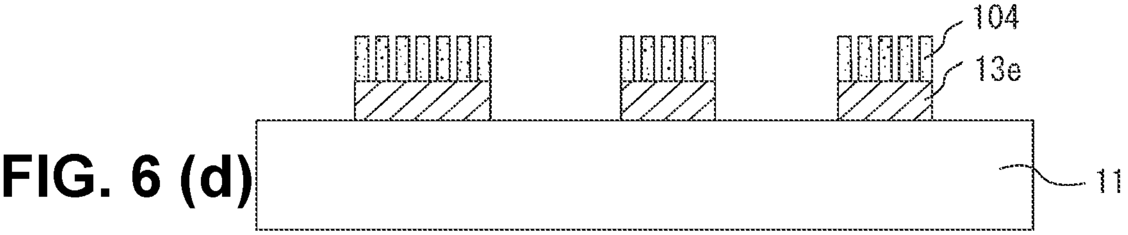
Figure 6:
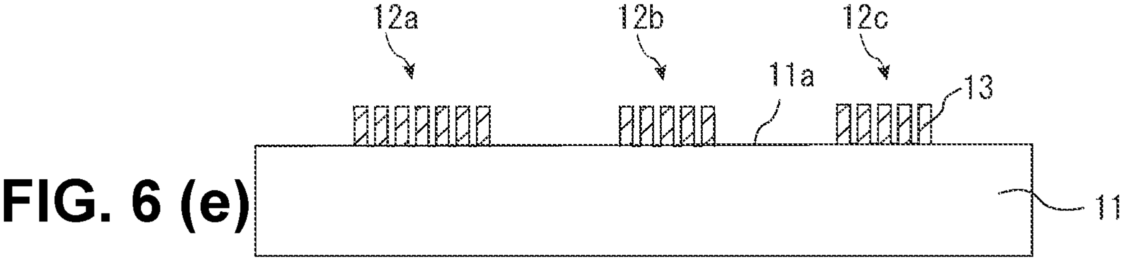

FIGS. 6(*a*) to 6(*e*) show another manufacturing process of the gradient polarizing element according to another embodiment of the present invention. FIGS. 6(*e*) is a BB line cross-sectional view of the above FIG. 4 like FIGS. 5(*f*), and the polarization portion has the structure shown in the above FIG. 3(*a*).

In the step of FIG. 6(*a*), a metal layer 13*d* is formed on the substrate 11. The substrate 11 can be made of the same material as the substrate 11 of the gradient polarization element 10, and the metal layer 13*d* can be made of the same metal material as the metal portion 13 of the gradient polarization element. The metal layer 13*d* can be formed by using the method described in the step of FIG. 5(*f*).

In the step of FIG. 6(*b*), a photosensitive resin layer is formed on the metal layer 13*d*, and the exposure processing of the photosensitive resin layer is performed by lithography on the basis of the prepared design data on the arrangement of the polarization portions 12 based on the polarization portion occupancy ratio to form a gradation function.

Then, masks 103 are formed to cover regions for forming polarization portions by etching. The masks 103 may be formed by the printing method, imprinting method or self-assembly technology or the like.

In the step of FIG. 6(*c*), the surface of the metal layer 13*d* that is not covered with the masks 103 is removed by etching. As an etching method, chemical etching, mechanical processing, ion beam processing, laser processing and the like can be used, and plasma etching is particularly preferable in view of processing accuracy.

Next, the masks 103 are removed. As a result, portions of the metal layer covered with the masks remain as convex portions 13*e*. As alternative examples of the manufacturing steps of FIGS. 6(*a*) to 6(*c*), the structure shown in FIG. 6(*c*) may be formed by exchanging the manufacturing steps of FIG. 6(*a*) and FIG. 6(*b*) using the lift-off process.

In the step of FIG. 6(*d*), a photosensitive resin layer covering the surfaces of the substrate 11 and the metal layers 13*e* is formed, the pattern of the metal portions of the polarization portion is exposed on the basis of the prepared design data which determines the width w, the pitch P2, and the thickness TH of the metal portions having a wire-grid structure of the polymerization portion, and then the exposed photosensitive resin layer is removed to form masks 104.

Slit-like grooves for forming a wire-grid structure are formed in the masks 104 on the convex portions 13*e*. The masks 104 may be formed using printing, imprinting, self-assembly technology, or the like. The steps of FIGS. 6(*b*) and 6(*d*) for forming the masks 103 and 104 may be performed simultaneously.

In the step of FIG. 6(*e*), the pattern of the metal portions 13 of the polarization portions 12*a* to 12*c* is formed on the surface of the substrate 11 by etching the convex portions 13*e* of the metal layer using the masks 104. As a result, the gradient polarization element is formed.

As the etching method, chemical etching, mechanical processing, ion beam processing, laser processing and the like can be used, and plasma etching is particularly preferable in terms of processing accuracy.

As an alternative example of this manufacturing method, the pattern of the metal portions 13 of the polarization portions 12*a* to 12*c* may be formed on the surface of the substrate 11 first, and then the metal layer 13*d* of the substrate portions 11*a* other than the polarization portions 12*a* to 12*c* may be removed. That is, after the step of FIG. 6(*a*), the steps of FIG. 6(*d*) and FIG. 6(*e*) are performed, and then the steps of FIGS. 6(*b*) and 6(*c*) are performed.

As another alternative example of the present manufacturing method, the convex portions 13*e* shown in FIG. 6(*c*) may be formed on the metal layer 13*d* in FIG. 6(*b*) by an electron beam using a stencil mask fabricated based on design data that determines the shape of the polarization portion and the polarization portion occupancy ratio to form a gradation function and further, the metal layer 13*d* of FIG. 6(*b*) may be formed directly on the surface of the substrate 11 shown in FIG. 6(*e*) to form the pattern of the metal portions 13 of the polarization portions 12*a* to 12*c* by an electron beam using a stencil mask fabricated based on design data including the design data that determines the width w, pitch P2 and thickness TH of the metal portions of the wire-grid structure of the polarization portions.

It is needless to say that, by combining the manufacturing steps described above, the polarization portion 32 having a wire-grid structure shown in FIG. 3(*b*) can be formed.

Further, by using the manufacturing steps shown in FIGS. 6(*a*), 6(*d*) and (*e*), a gradient polarizing element having polymerization portions 12*a* to 12*c* may be manufactured by forming the pattern of the metal portions 13 of the polymerization portions having a wire-grid structure on the entire surface of the substrate 11 and then removing part of the pattern to form the substrate portions 11*a* shown in FIG. 6(*e*).

As the method of removing the pattern, laser processing, press processing, plasma etching, chemical etching, ion beam processing, imprinting, drill processing, mechanical processing and the like can be used. The substrate portion 11*a* may be a through-hole penetrating the substrate.

According to this embodiment, since a large number of polarization portions 12 are arranged and formed on the substrate 11 based on the design data created by the design data preparation step for determining the specifications and arrangement of the polarization portions based on the polarization portion occupancy ratio of the polarization portions 12 in each region along the predetermined direction to achieve a desired gradation function, a polarizing element having a gradation function for at least one of light transmittance and polarization degree along the predetermined direction can be formed.

EXAMPLE

A gradient polarization element was formed by the manufacturing process shown in the above FIGS. 5(*a*) to 5(*e*).

First, design data for the arrangement of the polarization portions was created so as to gradually decrease the polarization portion occupancy ratio in six regions along the X-axis shown in FIG. 1 to form a gradation function, and the length and the pitch P1 in the longitudinal direction and the transverse direction of the polarization portion 12 were determined.

The polarization portions 12 were arranged in a square array. The width w, pitch P2, and thickness TH of the metal portion of the wire-grid structure of the polarization portion 12 were set to 50 nm, 140 nm, and 400 nm, respectively.

Then, the convex portions 100*cv* shown in FIG. 5(*b*) were formed on the surface of a 4-inch Si wafer by photolithography and anisotropic plasma etching.

Then, the mask 102 having slit-like grooves 102*g* for forming the wire-grid structure shown in FIG. 5(*c*) was formed by nanoimprint lithography.

Then, using anisotropic plasma etching, the pattern 100*sl* of the metal portions of the polarization portion shown in FIG. 5(*d*) was formed on the surface of the Si wafer with the mask 102 so as to fabricate the Si wafer mold 100*b*.

Figure 7:
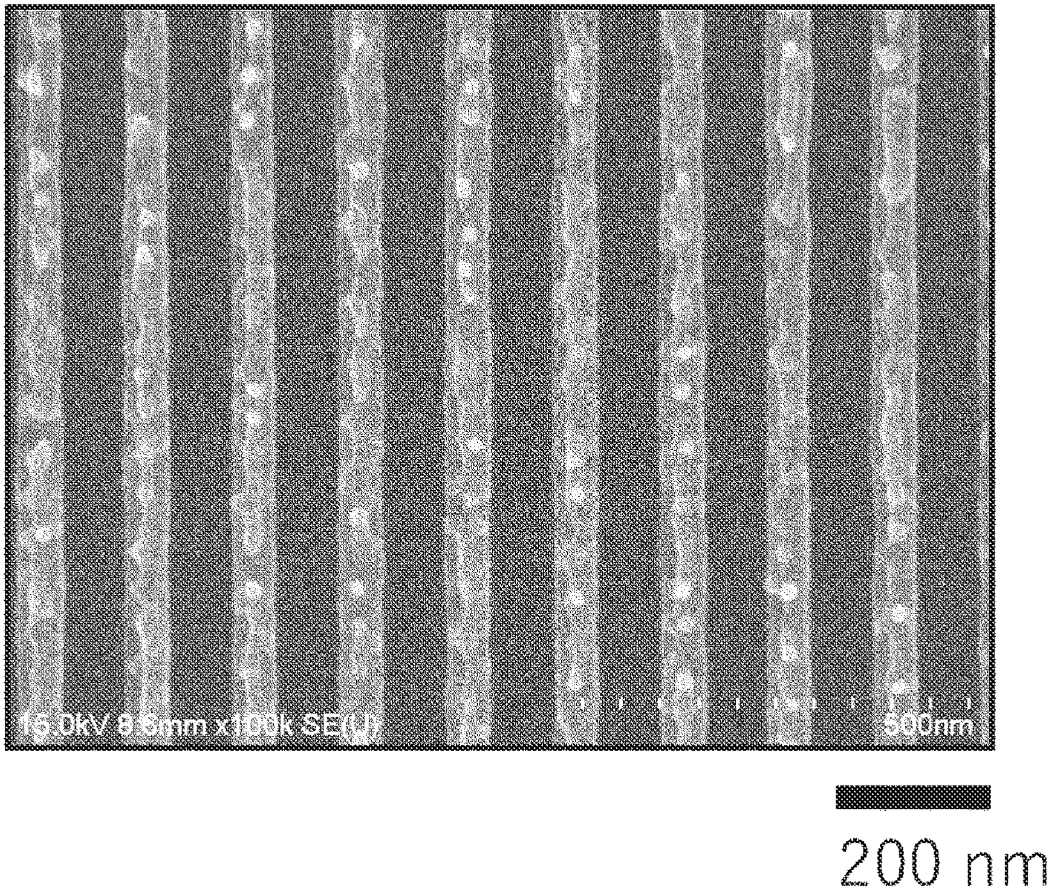
FIG. 7 is a scanning microphotograph of a mold for a gradient polarizing element as an example.

FIG. 7 is a scanning photomicrograph of a mold for a gradient polarization element of this example.

Referring to FIG. 7, it can be seen that the mold has the width and pitch of the protrusion portions for forming the metal portions of the pattern 100*sl* of the mold are 50 nm and 140 nm, respectively.

Then, using the thermal nanoimprinting method, the pattern of the grooves shown in FIG. 5(*f*) was formed by heating the polycarbonate sheet as the substrate 11 to 170 °C and pressing the mold against it.

Then, silver nano-ink (product name: NPS) manufactured by HARIMA CHEMICALS GROUP, INC. was filled into the grooves of the polycarbonate sheet by the squeezing method, and excessive silver nano-ink on the surface was removed by wiping.

Then, using an oven, the polycarbonate sheet was heated at 130 °C for 12 hours to sinter the silver nano-ink. As a result, the gradient polarization element of the example was fabricated.

Figure 8:
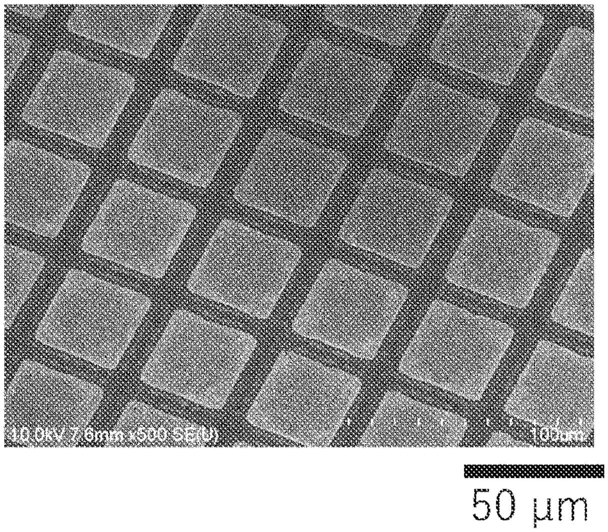
FIGS. 8(*a*) to 8(*c*) are scanning microphotographs of gradient polarization elements as examples.
Figure 8:
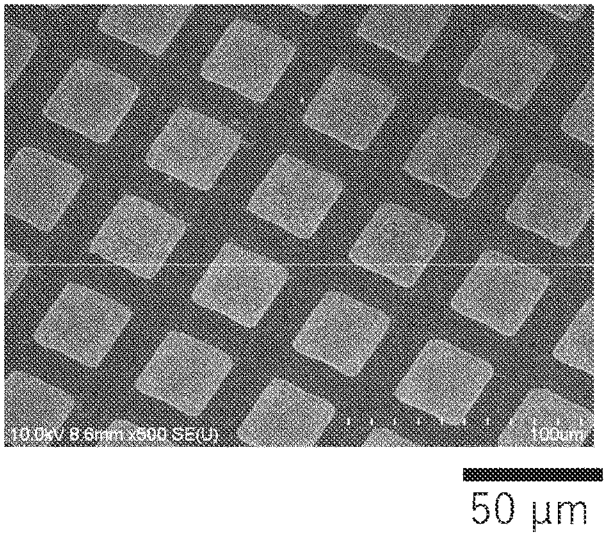
Figure 8:
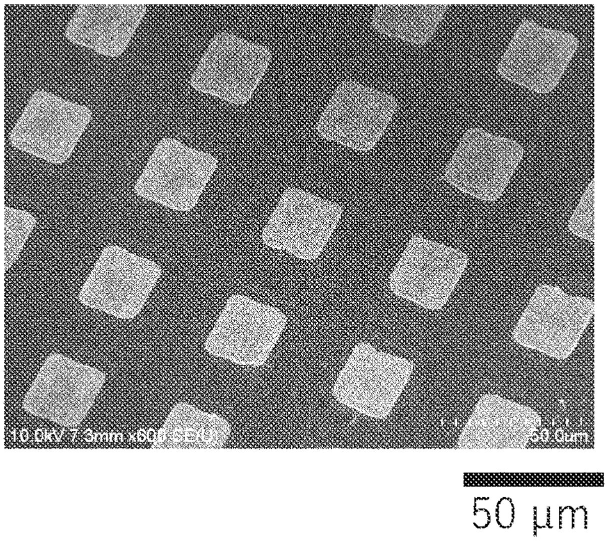

FIGS. 8(*a*) to 8(*c*) are scanning photomicrographs of a gradient polarization element as an example. Referring to FIGS. 8(*a*) to 8(*c*), rectangular portions with relatively bright contrast are polarization portions and relative dark portions between adjacent rectangles are substrate portions other than the polarization portions. It is understood from these scanning photomicrographs that regions (a), (b) and (c) having polarization portion occupancy rations of 64%, 36% and 20% were formed, respectively.

FIG. 9 shows the optical characteristics of the gradient polarization element of this example which were measured by irradiating incident light having a spot diameter of 2 mm to the gradient polarization element using a spectrophotometer. The incident light had a spot diameter of 2 mm at the position of the gradient polarization element.

The polarization degree and visual transmittance of the gradient polarization element were measured by a spectrophotometer (SolidSpec-3700) manufactured by Shimadzu Corporation, using linearly polarized incident light having electric field components oscillating in the parallel direction (Y-axis direction in FIG. 2(*a*)) and the perpendicular direction (X-axis direction in FIG. 2(*a*)), respectively, to the metal portions 13 of the wire-grid structure shown in FIGS. 2(*a*) and 2(*b*).

The visual transmittance can be obtained from transmittances (transmission spectra) at wavelengths of 380 to 780 nm (in 1 nm increments) and visual sensitivity curve.

Assuming that the visual transmittance of the gradient polarization element for polarized light rays in the parallel direction to the metal portion 13 of the wire-grid structure is Tp and that for polarized light rays in the perpendicular direction is Tv, the polarization degree V is expressed as $V=((Tv-Tp)/(Tv+Tp))^{1/2}$ Referring to FIG. 9, it can be understood that the gradient polarization element of this example has a gradation function for polarization degree since the polarization degree V gradually decreases from 99% to 13% in the region 1 having a polarization portion occupancy ratio of 100% to the region 6 having a polarization portion occupancy ratio of 8%.

While preferred embodiments of the present invention have been described in detail, it is to be understood that the present invention is not limited to the specific embodiments thereof and various changes and modifications may be made within the scope of the invention as set out in the accompanying claims. For example, although the substrate 11 has been described in the above embodiments as having no polarization function, it may have a polarization function as long as it has the gradation function of the present invention.

Although the plurality of polarization portions 12 have been described as having the metal portions 13 extending in a direction (Y-axis direction) perpendicular to the gradation direction (X-axis direction) of the polarization degree, the extending direction of the metal portions 13 is not limited to the perpendicular direction.

Although the metal portions 13 have been described as being extended in the same direction (Y-axis direction), they may be extended in any direction in each of the regions which differ in polarization degree or a random direction in each region. While the polarization portions 12 have been described as being formed on one main surface of the substate 11 in the above embodiments, some of the polarization portions 12 may be formed on the other main surface.

Since the gradient polarization elements of the present invention can also control the gradation of polarization degree, they are expected to be used in head-up displays that ensure both visibility and display functions, displays with advanced security measures such as the prevention of prying eyes from the surroundings through advanced polarization control, and amusement equipment such as glasses for 3-D TV and to expand the design and functionality.

DESCRIPTION OF THE SIGN

10, 110 gradient polarization element
11 substrate
11*a* substrate portion
12, 22, 32 polarization portion
13, 23, 33 metal portion

What is claimed is:

1. A polarization element comprising:
a substrate having a predetermined light transmittance in a predetermined wavelength region,
a plurality of polarization portions disposed on a main surface of the substrate, and
substrate portions which are parts of the substrate where the plurality of polarization portions are not disposed,
wherein each of the plurality of polarization portions includes a plurality of metal portions which extend in one direction, and each of the plurality of metal portions has a width w, a pitch P2, and a thickness TH, and the widths, the pitches, and the thicknesses are the same among the plurality of metal portions,
wherein each of the plurality of polarization portions is spaced apart from each other by the substrate portions along a predetermined direction, and are arranged to ensure that a ratio of a total area of the polarization portions included in a predetermined area of the main surface to the predetermined area gradually changes along the predetermined direction so that at least one of light transmittance and polarization degree gradually changes in the predetermined direction on the main surface of the substrate,
wherein the polarization portions are arranged with a first distance between adjacent polarization portions in the predetermined direction,
wherein the polarization portions are arranged with a second distance between adjacent polarization portions in a direction perpendicular to the predetermined direction, and
wherein the first and second distances are larger than the pitch P2 of the metal portions.

2. The polarization element according to claim 1, wherein the polarization portions are made different in size along the predetermined direction to change the ratio of the total area of the polarization portions included in the predetermined area of the main surface to the predetermined area.

3. The polarization element according to claim 1, wherein the number of the polarization portions is varied along the predetermined direction to change the ratio of the total area of the polarization portions included in the predetermined area of the main surface to the predetermined area.

4. The polarization element according to claim 1, wherein the predetermined direction is perpendicular to a longitudinal direction in which the metal portions extend.

5. The polarization element according to claim 1, wherein the plurality of metal portions are provided in the substrate and top surfaces of the metal portions are exposed.

6. The polarization element according to claim 1, wherein the plurality of metal portions are provided on the substrate.

7. The polarization element according to claim 1, wherein the substrate includes a plurality of teeth on the main surface and each of the plurality of metal portions are provided on a top and one side surface of each of the plurality of teeth.

8. The polarization element according to claim 1, wherein the polarization portions are arranged in a modular grid.

9. The polarization element according to claim 1, wherein the plurality of metal portions are columnar and extends perpendicularly to the main surface of the substrate.

10. A polarization element comprising:
a substrate having a predetermined light transmittance in a predetermined wavelength region;
a first region disposed on a first part of a main surface of the substrate and including a plurality of first polarization portions and first substrate portions, each of the plurality of first polarization portions being spaced apart by the first substrate portions;
a second region disposed on a second part of the main surface of the substrate and including a plurality of second polarization portions and second substrate portions, each of the plurality of second polarization portions being spaced apart by the second substrate portions; and
a third region disposed on a third part of the main surface of the substrate and including a plurality of third polarization portions and third substrate portions, each of the plurality of third polarization portions being spaced apart by the third substrate portions,
wherein:
the plurality of first, second and third polarization portions have the same wire-grid structure,
the first, second, and third regions have a first polarization portion occupancy ratio, a second polarization portion occupancy ratio, and a third polarization portion occupancy ratio, respectively, each of which is defined as a ratio of a total area of the plurality of polarization portions corresponding included per unit area of the respective region,
the first, second, and third polarization portion occupancy ratios decrease in order from the first to the third region, so that polarization degree decreases in the same order,
the same wire-grid structure includes a periodic structure with a pitch,
adjacent polarization portions in the first, second, and third regions are arranged with a first pitch, a second pitch, and a third pitch, respectively, and
each pitch of the first pitch, the second pitch and the third pitch is larger than the pitch of the periodic structure.

11. The polarization element according to claim 10, wherein the first, second, and third regions are arranged on the main surface of the substrate along a predetermined direction and provide a gradation of polarization degree along the predetermined direction.

12. The polarization element according to claim 10, wherein the first, second, and third polarization portions have at least one shape selected from the group consisting of square, rectangle, circle, oval, diamond-shaped, triangle, and polygon.

13. The polarization element according to claim 10,
wherein each of the first, second, and third polarization portions in a plan view has a size of 1 mm to 1 mm in a longitudinal direction and a transverse direction, and
wherein the pitch of the periodic structure is 400 nm or less.

14. The polarization element according to claim 10, wherein:

the first pitch, the second pitch, and the third pitch are different from each other or the same.

15. The polarization element according to claim 10, wherein:

each of the first, second, and third polarization portions is arranged in two dimensions along a first direction and a second direction intersecting the first direction, and the first, second, and third regions are arranged along the first direction.

16. The polarization element according to claim 15, wherein:

each of the first, second, and third polarization portions is arranged in a square-array regularly along the first direction and the second direction perpendicular to the first direction.

17. The polarization element according to claim 10, further comprising:

a fourth region disposed on a fourth part of the main surface of the substrate and including a plurality of fourth polarization portions, adjacent fourth polarization portions in contact with each other, wherein:

the plurality of the fourth polarization portions have the same wire-grid structure as the first, second, and third polarization portions, the fourth region has a fourth polarization portion occupancy ratio defined as the ratio of the total area of the fourth polarization portions per unit area of the fourth region, and the fourth polarization portion occupancy ratio is 100% and a polarization degree of the fourth region is the highest among the regions of the polarization element.

18. The polarization element according to claim 10, wherein the same wire-grid structure includes a plurality of metal portions, and each of the metal portions has the same width, the same pitch and the same thickness among the first, second, and third regions.

19. A polarization element comprising:

a substrate having a predetermined light transmittance in a predetermined wavelength region;

a first region disposed on a first area of a main surface of the substrate and includes a plurality of first non-polarization portions and first wire-grid structures, each of the plurality of first non-polarization portions being spaced apart by the first wire-grid structures;

a second region disposed on a second area of the main surface of the substrate and includes a plurality of second non-polarization portions and second wire-grid structures, each of the plurality of second non-polarization portions being spaced apart by the second wire-grid structures; and a third region disposed on a third area of the main surface of the substrate and includes a plurality of third non-polarization portions and third wire-grid structures, each of the plurality of third non-polarization portions being spaced apart by the third wire-grid structures, wherein:

each of the plurality of first, second, and third non-polarization portions is a part of the substrate where the first, second, and third wire-grid structures are not disposed, the first, second, and third wire-grid structures have the same configuration, the first, second, and third regions have a first non-polarization portion occupancy ratio, a second non-polarization portion occupancy ratio, and a third non-polarization portion occupancy ratio, respectively, each of which is defined as a ratio of a total area of the plurality of non-polarization portions corresponding included per unit area of the respective region, and the first, second, and third non-polarization portion occupancy ratios decrease in order from the first to the third region, so that polarization degree increases in the same order.

20. The polarization element according to claim 10, wherein the first pitch, the second pitch, and the third pitch are the same.

* * * * *